United States Patent [19]

Li

[11] 4,417,931

[45] Nov. 29, 1983

[54] WET COMPACTION OF LOW DENSITY AIR LAID WEBS AFTER BINDER APPLICATION

[75] Inventor: Shiu Kang L. Li, Toronto, Canada

[73] Assignee: CIP, Inc.

[21] Appl. No.: 283,426

[22] Filed: Jul. 15, 1981

[51] Int. Cl.³ .......................... B29J 5/00; B32B 17/00

[52] U.S. Cl. .................................. 156/62.2; 156/209; 264/119; 264/121; 264/128; 428/288

[58] Field of Search ..................... 156/62.2, 62.4, 181, 156/183, 209, 219, 220, 290, 291, 296; 264/109, 119, 120, 121, 128; 162/111-113, 205; 19/296; 428/224, 284, 288

[56] References Cited

U.S. PATENT DOCUMENTS

| | | | |
|---|---|---|---|
| 2,803,577 | 8/1957 | Colt et al. | 156/220 X |
| 3,088,859 | 5/1963 | Smith | 264/119 X |
| 3,692,622 | 9/1972 | Dunning | 161/124 |
| 3,764,451 | 10/1973 | Dunning | 161/124 |
| 3,776,807 | 12/1973 | Dunning et al. | 161/124 |
| 3,949,035 | 4/1976 | Dunning et al. | 264/90 |
| 3,976,734 | 8/1976 | Dunning et al. | 264/89 |
| 4,057,669 | 11/1977 | McConnell | 428/152 |
| 4,096,311 | 6/1978 | Pietreniak | 264/121 X |
| 4,127,637 | 11/1978 | Pietreniak et al. | 264/114 |
| 4,134,948 | 1/1979 | Baker | 264/518 |

OTHER PUBLICATIONS

Attwood and White, "A Dry-Forming Process for Multi-ply Board", Tappi, vol. 62, No. 2, Feb. 1979.

Casey, ed., "Pulp and Paper-Chemistry and Chemical Technology", vol. II, pp. 1112-1115 (3rd. ed. 1980).

*Primary Examiner*—William A. Powell

*Attorney, Agent, or Firm*—Thomas L. Secrest; Charles B. Smith

[57] ABSTRACT

In the manufacture of low density air laid webs of predominantly ligno-cellulosic material, the method and apparatus for bonding the dry web with binder and compacting the web with a wet, fabric covered surface so as to increase tensile strength and delamination resistance while reducing binder content and cost is described. Wet compaction of the binder laden web enables controlled penetration of the web with a smaller amount of binder than is possible without wet compaction, and also reduces energy consumption in drying due to the use of less binder.

11 Claims, 2 Drawing Figures

WET COMPACTION OF LOW DENSITY AIR LAID WEBS AFTER BINDER APPLICATION

BACKGROUND OF THE INVENTION

This invention relates to an improved method and apparatus for manufacturing air laid webs of predominantly ligno-cellulosic material, and to the product manufactured thereby. More specifically, this invention relates to a method of manufacturing a low density air laid web wherein the web, after binder application is compacted by a wet surface, thus allowing better controlled penetration of the web by the binder despite the use of significantly less binder. This wet compaction of the web reduces binder content and cost and energy consumption in drying, since less binder is used. The wet compaction also imparts greater tensile strength and delamination resistance to the finished web.

Prior to this invention, the full benefit of air laying of webs was not realized because much of the energy saved in the air laying process was expended to dry the web after it had been impregnated or laden with some type of liquid adhesive binder. Without wet compaction, full binder penetration commonly requires wetting of the web with binder to over 70% total moisture content, at which point most of the liquid binder soaks completely into the air laid web.

Although wetting the web to 70% moisture content and above is desirable in effecting binder penetration, this high level of moisture addition is actually self-defeating, because one of the desired features of the air laid process of web manufacturing is reduced consumption of energy in drying.

In the prior art, unless the air laid web is wetted with binder to over 70% moisture content, a large percentage of the aqueous binder remains superficially on the web surface. Attempts to improve binder penetration by increasing the binder content and reducing overall web moisture content were unsuccessful, because the binder nonetheless tends to stay on the web surface without penetrating to the web interior. Such a web after drying also shows an undesirable crusty texture and low delamination resistance.

Compacting the web after binder application is desirable in effecting binder penetration. A roller compaction on the binder-laden web is usually necessary to distribute the binder more uniformly in the air laid web. However, in the case of a 100% short, cellulosic fiber web, direct roller compaction on a binder-laden web surface is not possible because the short fibers adhere to the compacting roller surface. Even a "teflon" coated compacting roller will have fiber adhesion. A pebbled roller surface reduces the fiber pick up somewhat, but the problem is still not eliminated because binder eventually accumulates on the roller surface and causes fiber adhesion to the roller surface.

The concept of this invention, the use of a wetted fabric-wrapped surface to compact a binder-laden essentially 100% cellulosic fiber web, originates from the observation that the fabric surface in noncontinuous. Consequently, when the fabric surface is wetted with a liquid, the cohesive force between the fabric and the web is less than that between two smooth surfaces in contact. The addition of a surfactant to the liquid wetting the compacting fabric surface lowers its surface tension and further reduces the cohesive force between the compacting fabric and the web, resulting in insignificant fiber pick up during wet compaction.

SUMMARY OF THE INVENTION

The wet compaction process of this invention consists of compacting the binder-laden web of air laid predominantly ligno-cellulosic fibers with a wetted fabricwrapped surface to cause better controlled binder penetration while avoiding pick up of the web fibers by the compacting surface. The web may or may not be embossed prior to binder application and wet compaction. Wet compaction may be applied to one or both sides of the web.

It is an object of this invention to provide a process of manufacturing air laid webs wherein binder use and, consequently, drying energy, may be significantly reduced.

Another object of this invention is to provide a fabric wrapped compaction surface, which, when incorporated into a roller-supported loop, may be continuously cleaned with a combination of brush rollers, air, and water showers.

Another object of this invention is to provide a high bulk, absorbent product with unique surface softness properties without overcompaction and excessive binder application.

Another object of this invention is to provide a high bulk web with increased tensile strength, both wet and dry, with only a marginal decrease in bulk.

A further object of this invention is to provide a finished web with greater resistance to delamination, due to deeper binder penetration into the web interior.

Other objects and advantages of the present invention will be readily understood from the following detailed description taken in conjunction with the accompanying drawings.

DETAILED DESCRIPTION OF THE PREFERRED EMBODIMENT OF THE INVENTION

Figure 1:
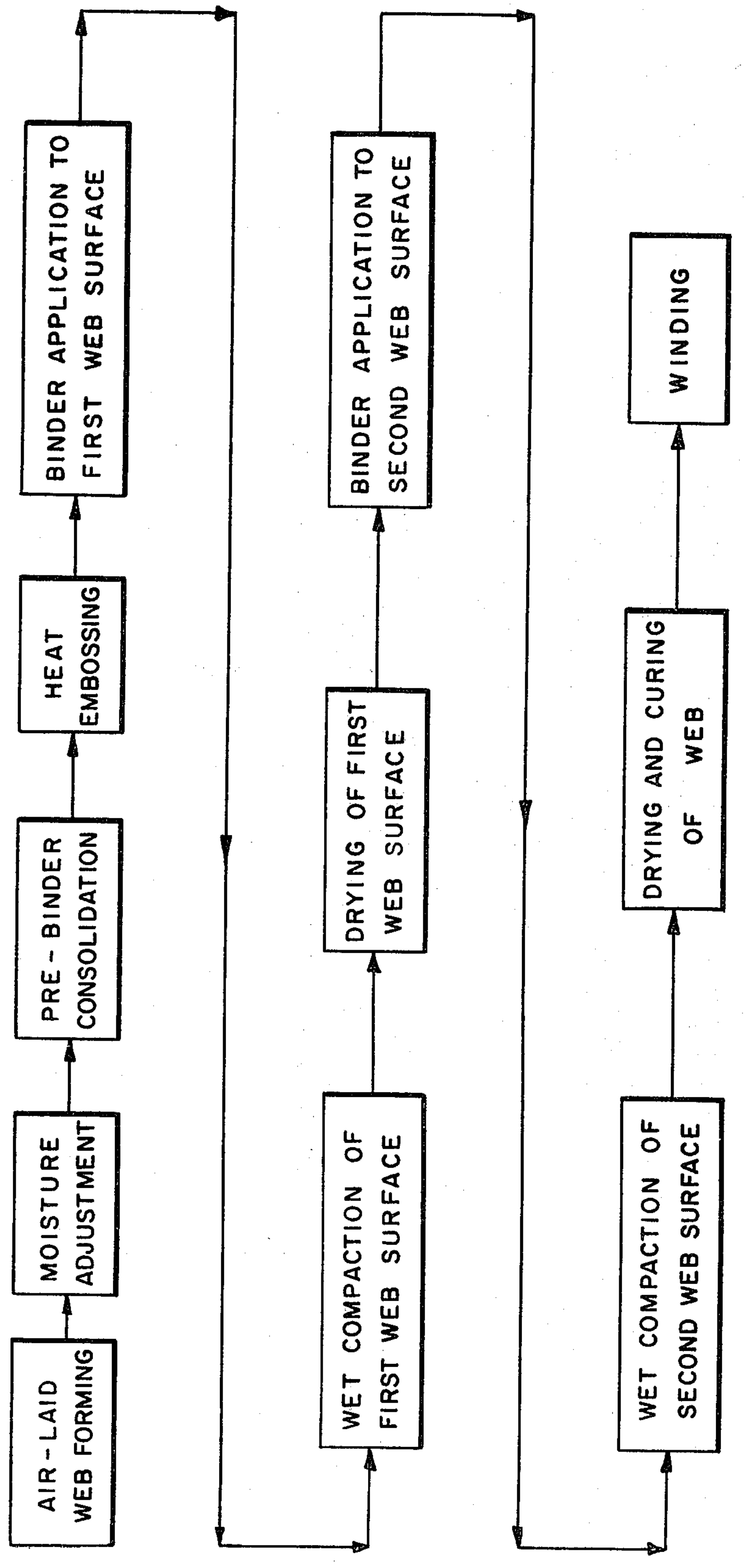
FIG. 1 is a block diagram of the components of a continuous manufacturing line for practicing the method of this invention.

The most significant advantage of wet compaction lies in its capability to maintain or increase finished web tensile strength while reducing binder content and cost and drying energy consumption. The improved tensile strength obtained in wet compacted webs despite the use of less binder can be attributed to the fact that immediately after an air laid web is laden with a binder, a large percentage of the applied liquid binder remains superficially on the web surface, except when the web is wetted to above 70% total moisture content, at which point the binder penetrates throughout the air laid web.

When less binder is used, some type of compaction is necessary to uniformly distribute the binder in the web. However, in the case of a 100% short, cellulosic fiber web, direct roller compaction on a binder-laden web surface is practically impossible because the short fibers are picked up by the compacting roller, even when that roller is teflon-coated.

However, use of a fabric wrapped surface to compact the binder-laden web avoids fiber pick-up, because the fabric surface is non-continuous. When the fabric surface is wetted with a liquid such as water, the cohesive force between the fabric and the web surface is less than that between the web and a smooth surface. The incorporation of a surfactant into the water wetting the compacting fabric to lower its surface tension further decreases the cohesive force between the compacting surface and the web surface.

When the liquid on the compacting surface is of a lower surface tension than that of the binder liquid on the web surface, the cohesive force between the fibers on the web is stronger than that between the compacting fabric and the web fibers. The result is that wet compaction with a surfactant on the compacting fabric causes no fiber sticking or pick-up problem, and thus is superior to the use of only water as the compacting surface wetting agent.

Use of a surfactant with good re-wetting properties also will improve the absorbency of the finished web, especially in webs bonded with a relatively hydrophobic polymer binder.

In the practice of this invention, a wet compaction station is added to a conventional air laid web manufacturing line at a point after binder application to the web surface has occurred. The wet compaction station is made up of a loop of rather fine mesh fabric supported by a plurality of rollers, which fabric is wetted continuously by an aqueous surfactant solution. The compacting roller of this loop is in nip relation with a roller supporting the fabric on which the air laid web is travelling. Passing through this nip, the binder-laden web picks up the aqueous surfactant solution from the compacting fabric, and the wet-compacted web releases smoothly and cleanly from the compacting nip, promoting better binder penetration throughout the web.

Because the air laid web after forming is weak and delicate, it should be subjected to pre-binder compaction to facilitate further treatment. This compaction strengthens the web at the pre-binder stage of manufacture, thus facilitating handling, but has negligible effect on finished web physical properties.

This compaction may also incorporate embossing of the unconsolidated web. In this method, the air laid web is moistened to approximately 10% water content and then embossed before application of the binder. The embossing nip consists of two heated rollers having nip separations of between 0.002 inch and 0.03 inch, one with a smooth surface and one with the desired embossing pattern. The embossed areas cover no more than 40% of the web surface area and have a much higher density than the unembossed areas. Such an embossed web has improved integrity and so is easier to handle during the subsequent steps of the manufacturing process. The advantages of wet compaction described above are also obtained with an embossed web.

TABLE I

| Sample No. | Web Characteristic | Total % binder solid on web | Web % Moisture after binder application to second web surface | Wet compaction after binder application? | Web % moisture after wet compaction | Dry machine direction tensile (g/7.6 cm) | Bulk/Basis Wt. Ratio $\left(\frac{\mu m/16 \text{ plies}}{g/m^2}\right)$ |
|---|---|---|---|---|---|---|---|
| 1a | Plain | 14 | 33 | No | — | 1260 | 159 |
| 1b | Plain | 14 | 33 | Yes | 45 | 1901 | 153 |
| 2a | Plain | 15 | 30 | No | — | 1677 | 189 |
| 2b | Plain | 15 | 30 | Yes | 39 | 1849 | 175 |
| 2c | Plain | 15 | 30 | Yes | 49 | 2082 | 164 |
| 2d | Plain | 15 | 30 | Yes | 59 | 2365 | 157 |
| 3a | Plain | 11 | 28 | No | — | 1426 | 170 |
| 3b | Embossed | 11 | 28 | No | — | 1584 | 149 |
| 3c | Embossed | 11 | 28 | Yes | 37 | 2024 | 140 |

Wet compaction applied after binder application to the second web surface.
Binder is Airflex 105, an ethylene - vinyl acetate emulsion binder from Air Products and Chemicals Inc.
A one percent aqueous solution of Triton GR-5M, a surfactant from Rohm & Haas Co., was used in wetting the wet compaction fabric.

The advantages of wet compaction on the finished web physical properties are apparent from the examples of webs in Table I, which describes the physical properties of finished air laid webs prepared with and without wet compaction. In practice, the kinds of binders that can be used in combination with wet compaction include common water based emulsion binders such as acrylics and vinyl acrylic polymers, ethylene-vinyl acetate copolymers, vinyl acetate polymers, styrene-butadiene copolymers, etc, or water soluble polymers such as polyvinyl alcohols, starches, carboxymethyl cellulose and polyamides, etc. In the web samples described in Table I, the webs were bonded with Airflex 105, a water based ethylene vinyl acetate emulsion binder supplied by Air Products and Chemicals Inc. Webs were laden with Airflex 105 on the first web surface, dried and then exposed to second surface binder application. Wet compaction was applied only in the treatment of the second web surface, using a one percent aqueous solution of Triton GR-5M, a surfactant supplied by Rohm & Haas Company, to wet the compacting fabric.

The improvement of tensile by wet compaction in sample 1*b* is, for example, 51% over 1*a*, the untreated sample, whereas the sacrifice in bulk is only 4%. The improvement in tensile strength varies with such conditions as the degree of compaction of the web before binder application, the amount of moisture at the point of wet compaction, and the wet compaction pressure. In webs that are relatively uncompacted before binder application, wet compaction after binder application to the second web surface produces webs with more than 80% increase in tensile while suffering a bulk decrease of only 10–15%.

Webs having as low as 35% moisture content after wet compaction show excellent delamination resistance, indicating improved binder penetration over webs without wet compaction.

Comparison of tensiles in samples 3*a*, 3*b* and 3*c* indicates that the tensile improvement by wet compaction also applies to embossed webs.

FIG. 1 illustrates in general that wet compaction after binder application can be practiced on both sides of the web. However, depending on the particular grade of low density products to be produced, wet compaction after binder application in a manufacturing line can be applied to one or both sides of the web.

Figure 2:
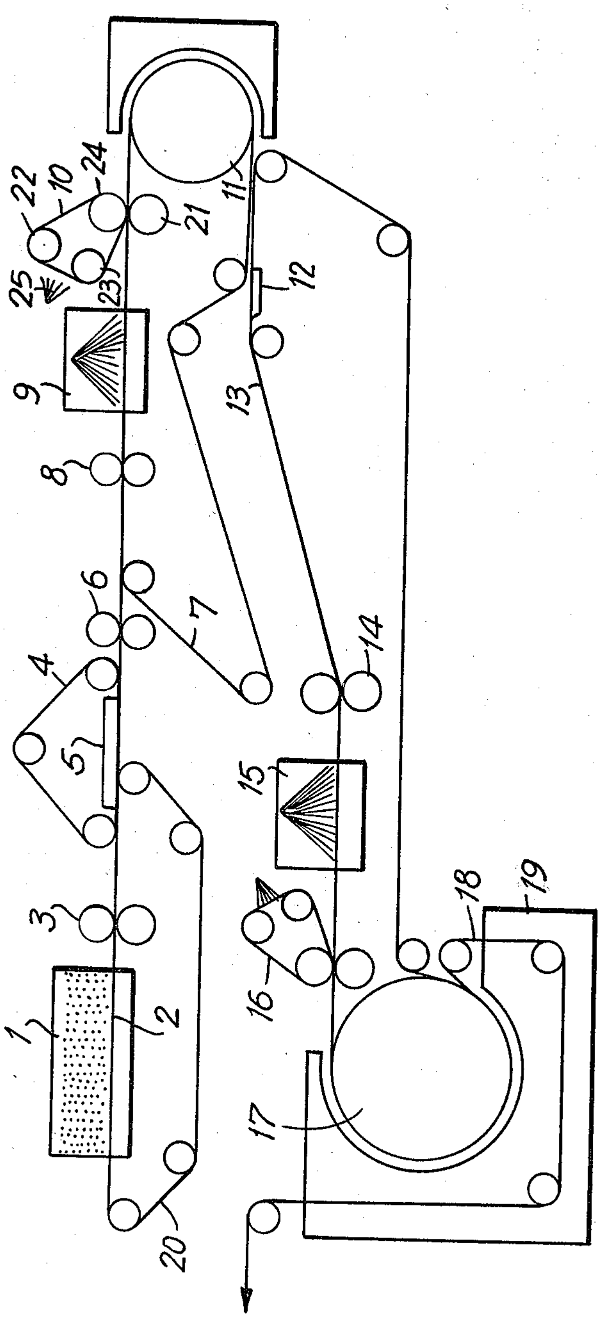
FIG. 2 is a schematic view of the components of a continuous manufacturing line embodying the apparatus for practicing the method of this invention.

FIG. 2 is an example of a manufacturing line for practicing the present invention. Referring to that figure, an air laid forming unit 1 forms an acceptable web 2 having a basis weight of 15–70 lb./2880 sq. ft. After forming, the web is pre-consolidated by passing through a nip of the compaction rollers 3. This compaction reduces the initial excessive bulk of the web and allows better pick up from the forming wire 20 with the assistance of vacuum 5. The free web is then embossed between heated rollers 6. The web may be moistened slightly as it enters the embossing nip to assist in the embossing process. From the embossing rollers 6 the web is picked up by a continuous fabric 7 which supports it throughout the first side binder application. The web top surface is smoothed by a pre-binder consolidation nip consisting of roller set 8. The web then enters a spraying chamber 9 where a predetermined amount of binder is applied. The assistance of vacuum maybe employed here to assure acceptable uniformity and controlled binder penetration. The web then enters the wet compaction station 10, supported by roller 21, which is in nip relation to roller 24. Rollers 22, 23 and 24 support a fabric wetted continuously by an aqueous surfactant solution 25. Final curing and drying of the binder applied to the first side of the web is performed by a dryer 11, which may be a through-air dryer, a floater dryer, radiant heat, microwaves, or other type dryer.

After the vacuum assisted transfer 12 of the one-side treated web to another continuous supporting fabric 13, the second side of the web is exposed to a similar binder treatment, utilizing again a surface smoothing nip 14 and binder application 15. If wet compaction of both sides of the web is desired the web then passes to another wet compaction station 16, substantially the same as station 10. The web is then dried by dryer 17. From the second dryer a free and fully consolidated web 18 is exposed to an additional thermal treatment 19 in order to further cure the binder on the fibers. Some light calendering may be done before the finished web is wound.

I claim:

1. The method of manufacturing a low density web of predominantly ligno-cellulosic material comprising the steps of:
   a. air laying ligno-cellulosic fibers on a fabric to form a web;
   b. applying a liquid binder to the web;
   c. compacting the binder-laden web with a wet surface; and
   d. drying and curing the wet-compacted web.

2. The method of claim 1 wherein the wet surface for compacting the binder-laden web is covered with a fabric.

3. The method of claim 1 wherein the total amount of binder is from 1% to 30% of the total dry weight of the finished web.

4. The method of manufacturing a low density web of predominantly ligno-cellulosic material comprising the steps of:
   a. air laying ligno-cellulosic fibers on a fabric to form an uncompacted web;
   b. compacting the web between a pair of compaction rollers;
   c. applying a liquid binder to the compacted web;
   d. compacting the binder-laden web with a wet surface; and
   e. drying and curing the wet-compacted web.

5. The method of claim 4 wherein the total amount of binder is from 1% to 30% of the total dry weight of the finished web.

6. The method of claim 4 wherein the wet surface for compacting the binder-laden web is covered with a fabric.

7. The method of forming a low density web of predominantly ligno-cellulosic material comprising the steps of:
   a. air laying ligno-cellulosic fibers on a fabric to form an uncompacted web;
   b. compacting the web between a pair of compacting rollers
   c. passing the web through a pair of embossing rollers;
   d. applying a liquid binder to the embossed web;
   e. compacting the binder-laden web with a wet surface; and
   f. drying and curing the wet-compacted web.

8. The method of claim 7 wherein compacting the binder-laden web with a wet surface comprises compacting the binder-laden web between a web-bearing fabric, supported by a smooth roller, and a roller covered by a fabric continuously wetted with water.

9. The method of claim 7 further comprising the step of moistening the web to approximately 10% moisture content prior to passing the web through a pair of embossing rollers.

10. The method of claim 7 wherein the total area covered by the embossed pattern does not exceed 40% of the total web area.

11. The method of claim 7 wherein the roller covered by a fabric is continuously wetted with an aqueous surfactant solution.

* * * * *